3,204,004
PROCESS FOR PREPARATION OF PHENYLACETYLENE

Arthur R. Sexton, Midland, Mich., assignor to The Dow Chemical Company, Midland, Mich., a corporation of Delaware
No Drawing. Filed June 2, 1961, Ser. No. 114,297
4 Claims. (Cl. 260—668)

The present invention relates to an improved process for the preparation of phenylacetylene.

It has now been found that phenylacetylene can be prepared in higher than heretofore obtained yields by reacting $\alpha,\beta$ - dibromoethyl benzene ($C_6H_5 \cdot CHBr \cdot CH_2Br$), commonly called styrene dibromide, with from 2 to 4 moles of an alkali metal hydroxide in the presence of non-primary alcohol having from 3 to 5 carbon atoms which can contain up to 50% by weight of water at temperatures of from about 100° to 175° C. and under a pressure at least equal to the autogenous pressure. The reaction is preferably and conveniently carried out under the autogenous pressure of the reaction mixture but higher pressures can be attained by use of an inert gas. The phenylacetylene product can be conveniently obtained from the reaction mixture by distillation. The present process employing secondary and tertiary alcohols as reaction solvents is preferable since little or no by-product such as the alkoxystyrene are produced contrary to the case when using a primary alcohol; e.g., methanol.

The reaction time varies from about 1 hour to about 10 or more hours and is somewhat dependent upon the temperature of the reaction. The reactants are employed in amounts of from about 2 to 4 moles, and preferably from about 2 to 3 moles, of alkali metal hydroxide per mole of styrene dibromide. The solvent is employed in amounts to provide a concentration of styrene dibromide in solvent of from about 0.5 to 10 moles, and preferably from about 0.5 to 3 moles, per liter of solvent. The solvent, a secondary or tertiary aliphatic alcohol having from 3 to 5 carbons, is preferably employed as an aqueous 50 to 95% solution and economically is the azeotrope concentration of the non-primary alcohol and water (e.g., isopropyl alcohol containing 12-13% of water).

It is to be understood that when the higher tertiary alcohols are employed slightly longer reaction periods are usually necessary because of the reduced solubility of the alkali metal hydroxide in these alcohols. Thus, while the amyl alcohols are useful, isopropyl, t.-butyl, and sec.-butyl alcohols are preferred for economy and commercial operation.

The alkali metal hydroxides which can be employed are lithium, sodium, potassium and cesium, commercially however, sodium and potassium hydroxides are the preferred hydroxides.

The following examples illustrate the present invention but are not to be construed as limiting:

Example 1

Four liters of aqueous 87% isopropyl alcohol was mixed with stirring with 480 g. (12 moles) of sodium hydroxide in a pressure reactor. Upon completion of the caustic addition 1056 g. (4 moles) of styrene dibromide was added, and, the reactor closed to the atmosphere. The reactor and contents were heated to 130°-135° C. for 5 hours. At this temperature the pressure within the reactor was 65-75 p.s.i.g. Thereafter the reactor and contents were cooled to room temperature, the reactor opened to the atmosphere; and the contents diluted with one-half liter of water to dissolve the sodium bromide of reaction. The reaction mixture was distilled to remove the alcohol as a water-alcohol azeotrope. The azeotrope contained about 4% phenylacetylene. The aqueous residue was steam distilled and a light oil was separated at a head temperature of 92°-100° C. The light oil distillate was dried, and redistilled under reduced pressure to obtain a fraction having a boiling point of 44°-46° C. at 20 mm. Hg identified as phenylacetylene. The yield of phenylacetylene based on styrene dibromide charged was 82%. This yield would be increased by the recovery of the 4% phenylacetylene in the azeotrope.

Example 2

In the manner of Example 1, employing KOH in place of NaOH, there was obtained a 77.3% yield of phenylacetylene based on the styrene dibromide charged.

Example 3

In a manner similar to Example 2, using a water-t.-butanol azeotrope in place of isopropanol-water azeotrope and reaction times of 5 and 10 hours, the yield of phenylacetylene was 48% and 68%, respectively, based on styrene dibromide charged.

Example 4

The results of runs made in the manner of Example 1, using aqueous 87% ethyl or propyl alcohol solvent, are recorded below:

| Alcohol: | Yield* percent |
|---|---|
| Ethanol | 47 |
| n-Propanol | 33 |

*Yield based on styrene dibromide charged.

I claim:

1. A method for preparing phenylacetylene which comprises reacting $\alpha,\beta$-dibromoethylbenzene in a non-primary aliphatic alcohol having from 3 to 5 carbon atoms which can contain up to 50% by weight of water and in the presence of an alkali metal hydroxide at between about 100° to 175° C. and under at least the autogenous pressure.

2. The process of claim 1 wherein the alcohol is aqueous isopropyl alcohol and is present in an amount to provide a concentration of from about 0.5 to 10 moles of the dibromoethylbenzene per liter of aqueous alcohol.

3. The process of claim 1 wherein the alkali metal hydroxide is present in an amount of from about 2 to 4 moles per mole of the dibromoethylbenzene.

4. The process of claim 1 wherein the alcohol is aqueous t.-butyl alcohol and is present in an amount to provide a concentration of from about 0.5 to 10 moles of the dibromoethylbenzene per liter of aqueous alcohol.

References Cited by the Examiner

UNITED STATES PATENTS

| 2,322,258 | 6/43 | Strosacker et al. | 260—677 |
| 2,440,497 | 4/48 | Winning et al. | 260—677 |
| 2,657,244 | 10/53 | Barney et al. | 260—668 |

(Other references on following page)

OTHER REFERENCES

Faraday's Encyclopedia of Hydrocarbon Compounds, vol. 3a, p. 08001.00.12, Chemindex Limited, London, 1947.

Fiesselmann et al., The Rearrangement of Acetyleneglycols with Acetyl Chloride, Chem. Ber., vol. 89, pp. 1775–1791, 1956. (Abstracted in Chem. Abstracts, vol. 51, p. 5737e).

Moureu et al., Bulletin de la Societe Chimique de France, Third series, vol. 25, p. 311 (1901).

The Perkin Reaction and Related Reactions, by John R. Johnson, Organic Reactions, Chapter 8, volume 1, pages 243–244, John Wiley and Sons, Inc., New York, 1942.

ALPHONSO D. SULLIVAN, *Primary Examiner*.

MILTON STERMAN, *Examiner*.